United States Patent
Zhang et al.

(10) Patent No.: US 10,013,615 B2
(45) Date of Patent: Jul. 3, 2018

(54) INSPECTION METHODS AND DEVICES (71) Applicant: Nuctech Company Limited, Haidian District, Beijing (CN)

(72) Inventors: Li Zhang, Beijing (CN); Zhiqiang Chen, Beijing (CN); Qiang Li, Beijing (CN); Jian Zhang, Beijing (CN); Jianping Gu, Beijing (CN); Jin Cui, Beijing (CN)

(73) Assignee: Nuctech Company Limited, Haidian District, Beijing (CN)

( * ) Notice: Subject to any disclaimer, the term of this patent is extended or adjusted under 35 U.S.C. 154(b) by 99 days.

(21) Appl. No.: 15/034,021

(22) PCT Filed: Nov. 7, 2014

(86) PCT No.: PCT/CN2014/090563
§ 371 (c)(1),
(2) Date: May 3, 2016

(87) PCT Pub. No.: WO2015/067208
PCT Pub. Date: May 14, 2015

(65) Prior Publication Data
US 2016/0335503 A1 Nov. 17, 2016

(30) Foreign Application Priority Data
Nov. 7, 2013 (CN) .......................... 2013 1 0546289

(51) Int. Cl.
*G06K 9/00* (2006.01)
*G06K 9/32* (2006.01)
(Continued)

(52) U.S. Cl.
CPC ........... *G06K 9/00771* (2013.01); *G06K 9/00* (2013.01); *G06K 9/3241* (2013.01); *G06K 9/38* (2013.01);
(Continued)

(58) Field of Classification Search
CPC .... G06K 9/00; G06K 9/00771; G06K 9/3241; G06K 9/4642; G06K 2209/09;
(Continued)

(56) References Cited

U.S. PATENT DOCUMENTS 7,706,502 B2    4/2010  Bueno et al. ................... 378/57
2003/0189510 A1* 10/2003 Anderton et al. .............. 342/22
(Continued)

FOREIGN PATENT DOCUMENTS

CN          1301960 A     7/2001
CN         102483803 A    5/2012
(Continued)

OTHER PUBLICATIONS

International Search Report for corresponding International Patent Application No. PCT/CN2014/090563 dated Jan. 28, 2015.
(Continued)

*Primary Examiner* — Andrew W Johns
(74) *Attorney, Agent, or Firm* — Merchant & Gould P.C.

(57) ABSTRACT

The present disclosure discloses an inspection method and device. The method comprises steps of acquiring a perspective image of an inspected object; processing the perspective image to obtain a region of interest; and automatically detecting the region of interest using a cigarette model, to determine whether the region of interest of the perspective image belongs to a cigarette. In the present disclosure, cigarette detection is implemented on a scanned image of goods, particularly a container, which can avoid the problem of detection vulnerability and poor effect of manual image judgment for the conventional manner, and is of significance in fighting against cigarette smuggling.

13 Claims, 5 Drawing Sheets (51) Int. Cl.
*G06K 9/38* (2006.01)
*G06K 9/40* (2006.01)
*G06K 9/42* (2006.01)
*G06K 9/46* (2006.01)
*G06K 9/62* (2006.01)

(52) U.S. Cl.
CPC ............... *G06K 9/40* (2013.01); *G06K 9/42* (2013.01); *G06K 9/4642* (2013.01); *G06K 9/627* (2013.01); *G06K 2209/09* (2013.01)

(58) Field of Classification Search
CPC . G06T 7/11; G06T 7/136; G06T 2207/30232; G01N 23/04; G01N 23/043; G01N 23/046
See application file for complete search history.

(56) References Cited

U.S. PATENT DOCUMENTS

2009/0174554 A1    7/2009    Bergeron et al. .......... 340/568.1
2010/0303287 A1* 12/2010    Morton ......................... 382/100

FOREIGN PATENT DOCUMENTS

| | | |
|---|---|---|
| GB | 2 501 026 A | 10/2013 |
| JP | 2002-535625 A | 10/2002 |
| JP | 2005-149506 A | 6/2005 |
| JP | 2009-009456 A | 1/2009 |
| JP | 2009-092658 A | 4/2009 |
| JP | 2011-216069 A | 10/2011 |
| JP | 2012-528397 A | 11/2012 |
| KR | 10-2006-0080284 A | 7/2006 |
| WO | 00/11456 A1 | 3/2000 |
| WO | WO-2010/138574 A1 * 12/2010 ............... G06K 9/00 |  |

OTHER PUBLICATIONS

Extended European Search Report for corresponding European Patent Application No. 14860336.8 dated May 16, 2017, 10 pages.
Japanese Office Action for corresponding Japanese Patent Application No. 2016-528054 dated Mar. 24, 2017, 8 pages.
Korean Office Action for corresponding Korean Patent Application No. 10-2016-7015104 dated Apr. 14, 2017, 13 pages.
Korean Office Action for corresponding Korean Patent Application No. 10-2016-7015104 dated Oct. 30, 2017, 9 pages.
Korean Office Action for corresponding Korean Patent Application No. 10-2016-7015104 dated Jan. 25, 2018, 9 pages.
Muhammet, B. et al., "Object Recognition in Multi-View Dual Energy X-ray Images", retrieved from the Internet: http://www.bmva.org/bmvc/2013/Papers/paper0130/paper0130.pdf, 11 pages (2013).
Franzel, T. et al., "Object Detection in Multi-View X-Ray Images", Pattern Recognition, Springer Berlin Heidelberg, pp. 144-154 (2012).

* cited by examiner

INSPECTION METHODS AND DEVICES

This application is a National Stage Application of PCT/CN2014/090563, filed 7 Nov. 2014, which claims benefit of Serial No. 201310546289.2, filed 7 Nov. 2013 in China and which applications are incorporated herein by reference. A claim of priority is made to each of the above disclosed applications.

TECHNICAL FIELD

Embodiments of the present disclosure relate to automatic detection of inspected objects in a radiation image, and in particular, to methods for inspecting cigarettes in a large-scale container scanning system and corresponding security inspection devices.

BACKGROUND

Fighting against cigarette smuggling is of great significance. Cigarette smuggling is considered to be the second largest smuggling activity after drugs. In recent ten years, although every country takes an active part in fighting against cigarette smuggling, a number of smuggled cigarettes still has a trend to increase. In 1996, smuggled cigarettes account for 6.5% of total sales of cigarettes. In 2009, this number increases to 11.6%, i.e., a number of the cigarettes reaches 675 billion, which causes a loss of 400 billion dollars to various national governments. Further, the harm of cigarette smuggling is embodied not only in threat of human health and loss of government revenue, but also in provision of capital sources to criminal organizations and terrorist organizations and even provision of expenditure for cigarette smuggling. The European Union even declares that all international criminal organizations are suspected to take part in cigarette smuggling. The harm of cigarette smuggling is increasing, which reflects that the related detection measures are not in place, which creates opportunities for criminals.

Currently, there is lack of active measures to detect cigarette smuggling internationally. Although various types of barcodes, watermarks or the like are frequently used for cigarettes, such measures are difficult to achieve effective inspection when the cigarettes are in transit, which brings little effect. According to researches, cigarette smuggling is primarily implemented by transporting a large amount of cigarettes through containers. Radiation imaging is implemented on goods, luggage or the like to achieve perspective imaging, so as to achieve a purpose of non-invasion inspection. Currently, radiation imaging has been widely applied in places such as airports, customs, stations, places for large gathering or the like, and is the most important measure in the field of security inspection of prohibited goods. In the process of inspection of containers, although images of goods in the containers have been obtained, there are a wide variety of types of goods, image judgers have uneven experiences, and probabilities that smuggled goods occur are relatively low, which results in barely satisfactory manual judgment results.

In recent years, with the rapid development of related subjects such as mode recognition, image processing or the like, automatic detection of prohibited goods becomes the focus of attention in the industry and academic circle. However, currently, there are few related literatures concerning automatic detection in Digital Radiography (DR) images of large-scale containers. In view of influences due to many factors such as imaging measures, application fields, data sources or the like, researches are typically made on small-scale luggage security inspection devices, for example, dual-energy DR, Computed Tomography (CT) or the like. Particularly, automatic detection of explosives and guns gets more attention from researchers due to being directly related to aviation safety. There is currently no specific published literature in the particular field of cigarette smuggling.

Object detection is currently a hot topic in the fields of computer vision, mode recognition or the like. With the development of image retrieval, there have been presented many referential research results. Particularly, with the occurrence of Histogram of Oriented Gradients (HOG) features, Deformable Part-based Model (DPM) algorithm, Deep Learning method or the like, the effects of object detection are significantly improved. In view of related researches, specific researches are made on a cigarette model in a radiation image in the present disclosure, and a better effect is obtained.

SUMMARY

With respect to the above problems, based on the market requirements, the embodiments of the present disclosure propose a novel method for automatically detecting cigarette smuggling on the basis of using a DR image of a container by virtue of related researches on automatic object detection. The purpose thereof is to automatically detect whether there is a cigarette in an image through an algorithm by means of ray scanning and imaging in the process of smuggling suppression of the container. If there is a cigarette, a position where the cigarette is located in the image is provided, so as to aid in manually judging whether there is a smuggling case.

In order to achieve the purpose of aiding in manual works, the performance of the algorithm is also a task required to be considered. The detection algorithm must have low false alarm rate and missing report rate, and must further satisfy the requirements for real time detection. The embodiments of the present disclosure obtain a better effect by implementing specific researches on the cigarette modes. The false alarm rate of the algorithm is lower than 0.5%, and the missing report rate of the algorithm is lower than 10%. Further, the algorithm may be completed within 1 second, which satisfies the above application requirements.

Further, in order to enable the algorithm to satisfy applications in particular cases, the algorithm may preferably have a self-learning function. With respect to an image in which a cigarette is confirmed but cannot be detected, the algorithm may implement self-learning, which satisfies the requirements for detection of a change in the cigarette mode when the cigarette package changes. The confirmation mechanism comprises manual cigarette image input and automatic cigarette image acquisition through a customs declaration or the like.

According to the embodiments of the present disclosure, there is provided a method for automatically detecting cigarettes in a perspective image of a container in security inspection, comprising steps of: acquiring a perspective image of an inspected object; processing the perspective image to obtain a region of interest; and automatically detecting the region of interest using a cigarette model, to determine whether the region of interest of the perspective image belongs to a cigarette.

The container is generally large, and in order to achieve detection in real time, there is no need to achieve a high image resolution. By taking an image at 5 mm/pixel as an example, a large amount of cigarettes are presented in a stripe texture form in the image. Such feature actually reflects cigarette packages instead of the cigarettes per se. Such feature is generated in that the cigarette packages tend to be identical in various countries in the world in order to reduce the harm of smoking and avoid attraction of personalized packages to teenagers, which just provides a condition for effective detection. With the above features, the present disclosure can accurately and rapidly recognize a cigarette in a perspective image of a container in security inspection through steps such as image acquisition, region of interest acquisition, cigarette model setup, automatic detection or the like.

According to some embodiments, wherein before the step of automatically detecting the region of interest using a cigarette model, the method further comprises a step of setting up a cigarette model including steps of: setting up a cigarette image library; processing images in the cigarette image library to obtain respective regions of interest; extracting features of the regions of interest of the images in the cigarette image library; and training a classifier based on the extracted features to generate the cigarette model.

According to some embodiments, the step of setting up a cigarette image library comprises: scanning cigarette images of different numbers of cigarettes in various arrangement forms in a container to obtain a positive sample library of the cigarette model; and collecting images of objects similar to the cigarettes and random objects to form a negative sample library of the cigarette model, wherein no image in the negative sample library comprises a cigarette.

According to some embodiments, in the step of setting up a cigarette model, scanned images of the cigarettes which are stacked in various rules are divided into multiple modes with different widths, and the positive sample library of the cigarette model is generated based on the multiple modes.

According to some embodiments, the step of extracting features of the regions of interest of the images in the cigarette image library comprises: manually marking positions of the cigarettes in units of cases to form a set of positive sample features in the multiple modes; and randomly extracting multiple samples from the negative sample library for feature extraction to form a set of negative sample features.

According to some embodiments, the step of training a classifier based on the extracted features comprises: (1) training the classifier in a case that the set of positive sample features and the set of negative sample features are given; (2) classifying the positive samples and the negative samples using the classifier; (3) removing negative samples which are easily to be categorized according to a degree of confidence of a result, and re-adding enough random negative samples; and (4) repeating the above steps (1), (2) and (3), until a change in a classification result of the classifier is small enough or an enough number of iterations is reached.

According to some embodiments, the method further comprises: performing a manual markup process or an automatic customs declaration analysis process on an image for which no cigarette is detected, to obtain a new cigarette image and update the cigarette model.

In practical detection, in the case of different detection environments (for example, but not limited to scanning manners, container conditions or the like), scanning devices, and arrangement modes, the cigarette image may present a large difference from the set-up model. In order to enable the method according to the present disclosure to adapt to more specific detection environments, scanning devices and arrangement modes, according to the embodiments of the present disclosure, the method further comprises a self-learning function. The method can adapt to different detection environments, scanning devices and cigarettes in more package forms by continuously updating the cigarette model.

According to some embodiments, in the step of acquiring a perspective image of an inspected object, the image is scaled to a uniform resolution, and is stretched in gray, so that the whole possible value range is filled with a value domain of the image to implement a normalization operation.

According to some embodiments, in the step of processing the perspective image to obtain a region of interest, an air part in the perspective image is removed to prevent an air noise from generating a detection result.

According to some embodiments, in the step of processing the perspective image to obtain a region of interest, a binaryzation process is implemented on the perspective image with an air value using an air brightness threshold method, and a cigarette detection process is implemented only on a part of the image which has brightness lower than the threshold.

According to some embodiments, the step of automatically detecting the region of interest using a cigarette model comprises: normalizing a given image to be detected and acquiring a region of interest of the image to generate Histogram of Oriented Gradients (HOG) features of the region of interest; traversing the HOG features using a sliding window to solve a maximal degree of confidence thereof in each window in multiple modes; and determining a position where a degree of confidence is larger than a particular threshold as a position where a cigarette is located.

According to some embodiments, a cigarette is detected in multiple scales.

The embodiments of the present disclosure further provide an inspection device, comprising: a digital radiation photographing apparatus configured to detect an inspected object with a ray to obtain a perspective image of the inspected object; and an image processing apparatus configured to process the perspective image to obtain a region of interest, and automatically detect the region of interest using a cigarette model, to determine whether the region of interest of the perspective image belongs to a cigarette.

According to some embodiments, the device is configured to automatically detect cigarette smuggling.

In the embodiments of the present disclosure, cigarette detection is implemented on a scanned image of goods, particularly a container, which can avoid the problem of detection vulnerability and poor effect of manual image judgment for the conventional manner, and is of significance in fighting against cigarette smuggling. The present disclosure proposes a technical solution of automatically judging cigarette smuggling through a detection algorithm in the field for the first time, and achieves good performance and strong practicability through practical verification.

BRIEF DESCRIPTION OF THE DRAWINGS

These and other aspects of the present disclosure will be obvious and set forth with reference to the embodiments described below. In the accompanying drawings.

DETAILED DESCRIPTION

Specific embodiments of the present invention will be described below in detail. It should be noted that the embodiments described herein are illustrated merely by way of example instead of limiting the present invention. In the following description, numerous specific details are set forth in order to provide a thorough understanding of the present invention. However, it is obvious to those skilled in the art that the present invention may be practiced without these specific details. In other instances, well known circuits, materials or methods have not been described in detail to avoid obscuring the present invention.

Reference throughout this specification to "one embodiment", "an embodiment", "one example" or "an example" means that a particular feature, structure, or characteristic described in connection with the embodiment or example is included in at least one embodiment of the present invention. Thus, the appearances of the phrase "in one embodiment", "in an embodiment", "one example" or "an example" in various places throughout this specification are not necessarily all referring to the same embodiment or example. Furthermore, the particular features, structures, or characteristics may be combined in any suitable combination and/or sub-combination in one or more embodiments or examples. In addition, those skilled in the art should understand that the accompanying drawings provided herein are illustrative, and are not necessarily drawn to scale. It should be understood that when an element is recited as being "coupled to" or "connected to" another element, the element can be directly coupled or coupled to the further element, or otherwise there may be an intervening element interposed therebetween. In contrary, when an element is recited as being "directly coupled to" or "directly connected to" another element, there is no intervening element interposed therebetween. The same reference numbers are used to refer to the same elements. A term "and/or" used herein comprises any or all combinations of one or more listed related items.

A device for imaging and inspecting a moving object according to the present disclosure will be described below in conjunction with accompanying drawings. As shown, a device for inspecting a container will be described as an example. The following description is merely used to illustrate the present disclosure in conjunction with instances, instead of limiting the present disclosure thereto.

According to some embodiments of the present disclosure, an inspection method is proposed to solve the problem in the related art that it is impossible to automatically inspect cigarette smuggling. According to this method, a perspective image of an inspected object is firstly acquired. Then, the perspective image is processed to obtain a region of interest. Subsequently, the region of interest is automatically detected using a cigarette model, to determine whether the region of interest of the perspective image belongs to a cigarette. Thus, when a moving object (i.e., inspected weapons) such as a container vehicle is inspected, whether there is cigarette smuggling in the vehicle can be automatically inspected, and an alert may be provided to an image judger or the cigarette may be accurately positioned in the image.

Figure 1:
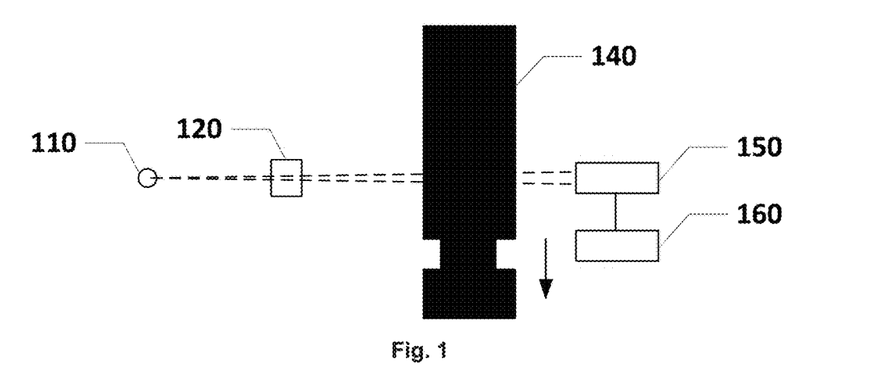
FIG. 1 illustrates a structural diagram of an inspection device according to an embodiment of the present disclosure.

FIG. 1 is a diagram of an inspection device according to an embodiment of the present disclosure. As shown in FIG. 1, a ray source 110 generates an X-ray beam, which is collimated by a collimator 120 for security inspection of a moving container truck 140. The ray transmitted through the truck is detected by a detector 150, and thereby a perspective image is obtained. The perspective image is processed using an image processing apparatus 160 such as a computer to judge whether there is a cigarette while implementing the above inspection. According to some embodiments, if it is judged that there is a cigarette, the cigarette is marked in the image or an image judger is alerted that a cigarette is carried in the container truck.

Figure 2:
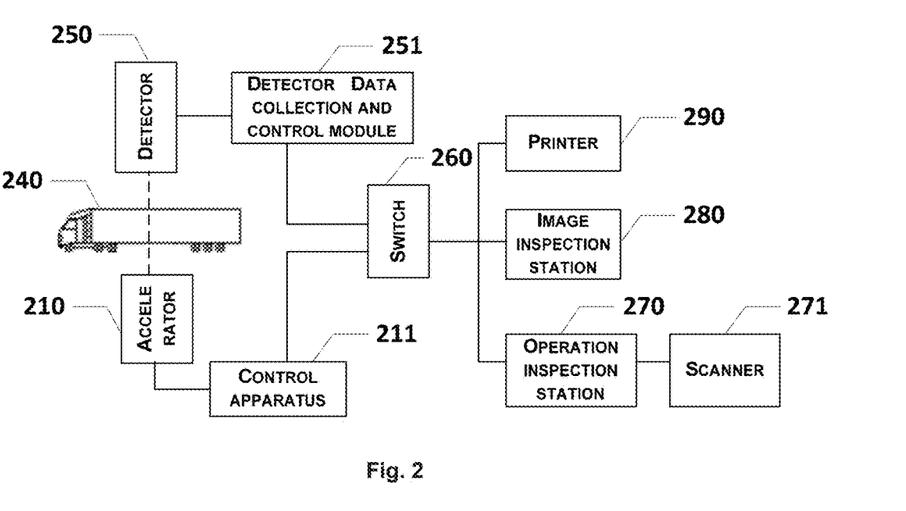
FIG. 2 illustrates a structural block diagram of an inspection device according to an embodiment of the present disclosure.

FIG. 2 illustrates a diagram of deployment of an inspection device according to an embodiment of the present disclosure. As shown in FIG. 2, for example, a ray source of an accelerator 210 and a detector 250 are hardware devices, a data collection and control module 251 is connected to the detector 250 and is used to control the detector 250, and the control apparatus 211 is connected to the accelerator 210 and is configured to control start and end of beam emission from the accelerator 210.

An image inspection station 280 and an operation inspection station 270 are working stations which are matched with a scanning device, and are connected to and communicated with the data collection and control module 251 via a switch 260. An image result may be printed through a printer 290. A scanner 271 is connected to the operation inspection station 270, and is used to input other information such as data of customs clearance. In other embodiments, information may be input through other input apparatuses such as a keyboard.

With the above device, in some embodiments, an X ray is generated by the accelerator 210, and the X ray which is transmitted through an inspected object 240 is received by the detector 250 to implement transmission imaging on the inspected object. The perspective image is processed using an image processing apparatus (for example, the image inspection station 280) such as a computer, to judge whether there is a cigarette. According to some embodiments, if it is judged that there is a cigarette, the cigarette is marked in the image or an image judger is alerted that a cigarette is carried in the container truck. Thus, when a moving object such as a vehicle is inspected, if there is a cigarette, the cigarette may be accurately positioned in an image of the target.

Figure 3:
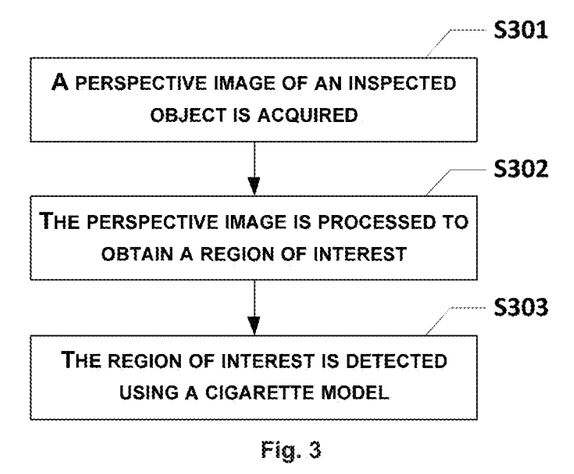
FIG. 3 illustrates a flowchart of a method for automatically detecting cigarettes according to an embodiment of the present disclosure.

FIG. 3 illustrates a method for automatically detecting cigarettes in a perspective image of a container in security inspection according to an embodiment of the present disclosure. As shown in FIG. 3, in step S301, a perspective image of an inspected object is acquired. In step S302, the perspective image is processed to obtain a region of interest. Then, in step S303, the region of interest is detected using a cigarette model, to determine whether the region of interest of the perspective image belongs to a cigarette. According to some embodiments, the step of automatic detection comprises feature extraction and judgment of an image to be inspected and markup of a suspected region or the like.

Implementations of various steps in the above method will be described below in detail. It should be understood by those skilled in the art that the following implementations are merely exemplary instead of limiting.

Image Acquisition

Different scanning devices may be used to obtain different images due to different energy/dosages of ray sources and different sizes of detectors. Preferably, the image may firstly be normalized to reduce such difference.

The container is generally large, and in order to achieve detection in real time, there is no need to achieve a high image resolution. By taking an image at 5 mm/pixel as an example, a large amount of cigarettes are presented in a stripe texture form in the image. Such feature actually reflects cigarette packages instead of the cigarettes per se. Such feature is generated in that the cigarette packages tend to be identical in various countries in the world in order to reduce the harm of smoking and avoid attraction of personalized packages to teenagers, which just provides a condition for effective detection. Therefore, without loss of generality, an image may be scaled to a uniform resolution such as about 5 mm/pixel, and be stretched in gray, so that the whole possible value range is filled with a value domain of the image, to complete a normalization operation.

The pixel resolution of the image illustrated above is 5 mm/pixel. However, it can be understood by those skilled in the art that the above resolution is not the only selection, and instead, the above resolution may be suitably modified according to an actual size of the cigarette package.

Extraction of Region of Interest

Before detection, an air part in the image is preferably removed to prevent an air noise from generating a detection result. Optionally, a binaryzation process is implemented on the image with an air value using an air brightness threshold method. For example, an air brightness threshold may be predetermined, and a region where brightness exceeds the brightness threshold is considered as an air region. Therefore, cigarette detection is implemented only on a part of the image which has brightness lower than the threshold.

Setup of Model

Object detection is primarily based on two categories of methods, i.e., sliding window and sub region. The former is implemented in a traversing manner, in which case a window with a fixed size slides in various scales of the image, and it is determined whether each pixel is a target object in each scale through calculation; and the latter is implemented using a method such as image segmentation or the like, in which case feature extraction and target detection are implemented on a sub region in an unfixed shape in the image.

According to the researches of the inventor through comparison, although the sliding window method may result in a computational complexity which is much more than that of the sub region method, the sliding window method achieves a much higher accuracy. Therefore, in the embodiment of the present disclosure, the sliding window method is preferably used.

Figure 4:
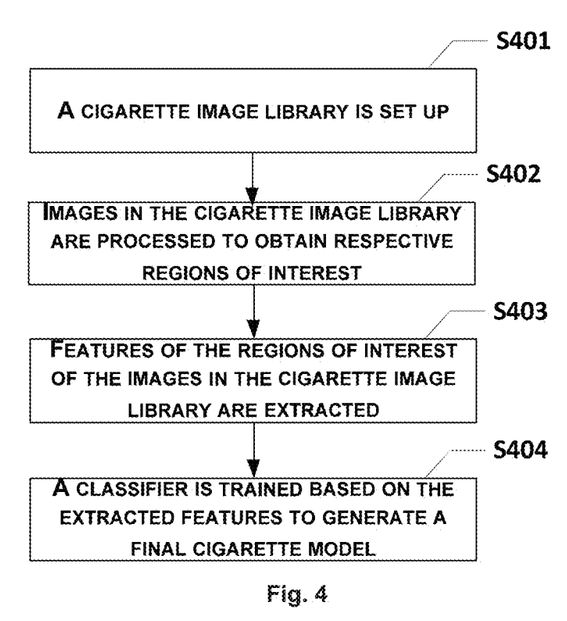
FIG. 4 illustrates a flowchart of setting up a cigarette model according to an embodiment of the present disclosure.

As shown in FIG. 4, the step of setting up a cigarette model comprises: step S401 of setting up a cigarette image library; step S402 of obtaining regions of interest; step S403 of extracting features; and step S404 of training a classifier to generate a cigarette model.

Figure 5:
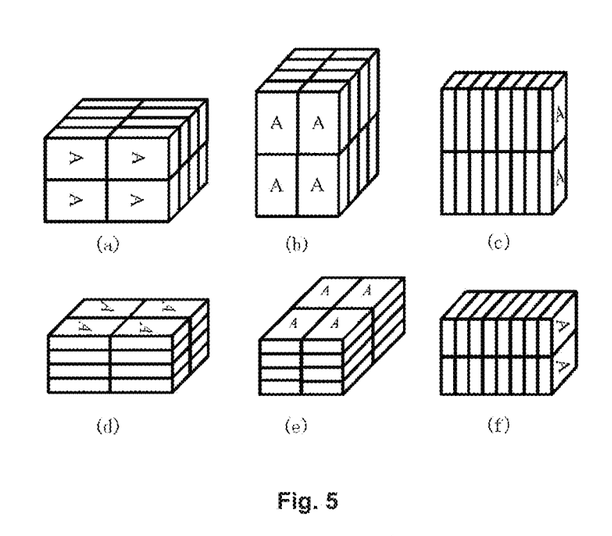
FIG. 5 illustrates six arrangement forms for cigarettes.
Figure 7:
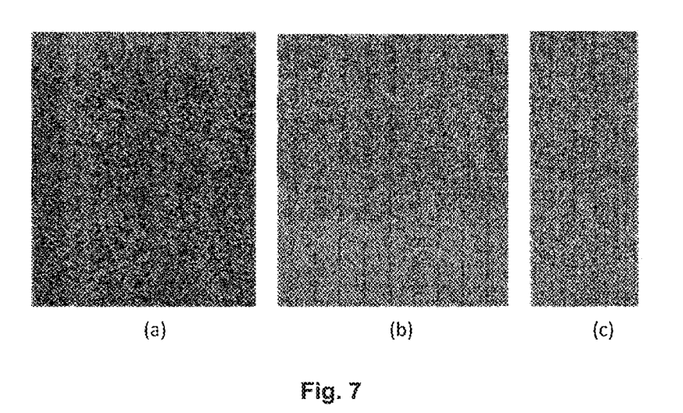
FIG. 7 illustrates three modes of cigarette images.

The cigarette model is to model image modes of cigarettes. Therefore, extraction of image modes is the important point for the algorithm. Without loss of generality, the cigarette images may be different due to different cigarette package forms, arrangement methods, numbers or the like. The package forms tend to be identical, which makes the problem simple, and results in that a few modes may generalize a majority of conditions. Different numbers may cause a change in image gray and fringe intensity, which needs to be overcome in the feature extraction algorithm. The arrangement form brings a very large influence, which is summarized by the inventor into three modes. Without loss of generality, the arrangement form of the cigarettes may be any of six arrangement forms in FIG. 5. As the containers are scanned using fan-shaped ray beams (as shown in FIG. 4), horizontal edges are stacked in three dimensions in a ray direction, so that the cigarettes are presented as vertical stripes with different widths. According to the inventor's researches, the vertical stripe textures of the cigarettes may be summarized into the following three modes illustrated in FIG. 7, i.e., the arrangement forms in FIGS. 5(*a*) and 5(*d*) generate wide stripes in FIG. 7(*a*), the arrangement forms in FIGS. 5(*b*) and 5(*e*) generate relatively narrow stripes in FIG. 7(*b*), and the arrangement forms in FIGS. 5(*c*) and 5(*f*) generate narrow stripes in FIG. 7(*c*). On the basis of the above analysis, the inventor proposes three cigarette modes in different arrangement forms, and sets up a model using an algorithm. The features of the above three modes are skillfully utilized in the present disclosure, so that after the model is set up, training and/or leaning can be implemented automatically without depending on initial manual markup. Therefore, this greatly saves labor cost and improves detection efficiency and accuracy. It should be understood by those skilled in the art that in other embodiments, more arrangement forms may also be used to generate other modes.

The model comprises a feature extraction algorithm and a classifier. According to the above analysis, the model is set up as follows.

A) Setting up a cigarette detection database. A large amount of cigarette images are collected, so that the six arrangement forms are distributed uniformly, wherein there may be at least one case of cigarettes and at most multiple cases of cigarettes which occupy the width of the whole container. Rectangular cigarette regions are manually marked in units of cases in the scanned two-dimensional image. Images in all marked rectangular frames form a positive sample library. Further, other various types of goods are randomly scanned to form a negative sample library.

B) Extracting features of images in all cigarette regions in A to form three sets of features in three modes.

C) Randomly extracting three sets of negative samples with enough samples in the negative samples, and extracting features thereof.

D) Training a classifier using the positive samples and negative samples obtained in B and C.

E) Optimizing the classifier using existing algorithms in the fields of machine learning and mode recognition. For example, by virtue of the idea of Boosting, samples which are easily to be categorized are continuously discarded, new random samples are continuously added, and steps C and D are repeated, until the error rate is low enough or the algorithm converges, to obtain the classifier.

F) Adjusting the positions of the positive samples using the existing algorithm, to reduce influences due to errors resulting from human markup. For example, by virtue of the idea of latent variable models in DPM, assuming that the positions of human markups are not completely accurate, after the classifier is obtained in D, offsets are made to positions of the positive samples in A, to obtain positions of the positive samples in the condition of the classifier. The steps B to E are repeated to obtain the optimized classifier.

In the context of the present disclosure, the cigarette model may be set up independently of automatic cigarette detection. That is, after the cigarette model is set up, the automatic cigarette detection may be implemented on the perspective image using the set-up cigarette model.

Automatic Detection Process

Figure 6:
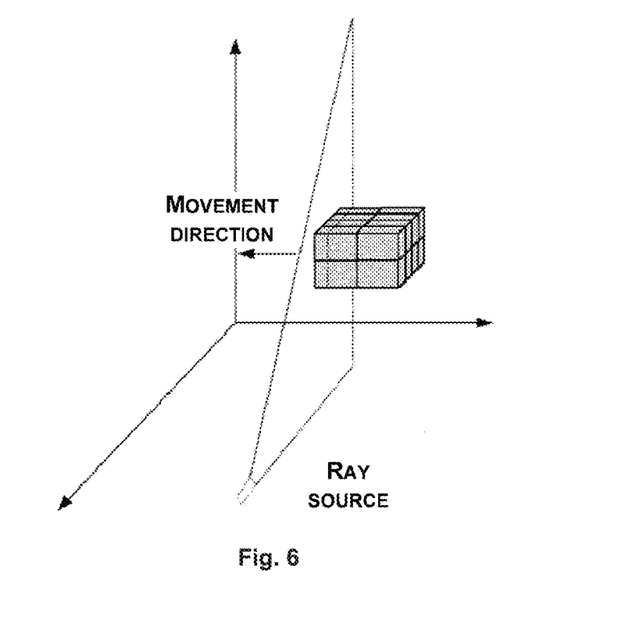
FIG. 6 illustrates a diagram of scanning cigarettes in a container.
Figure 8:
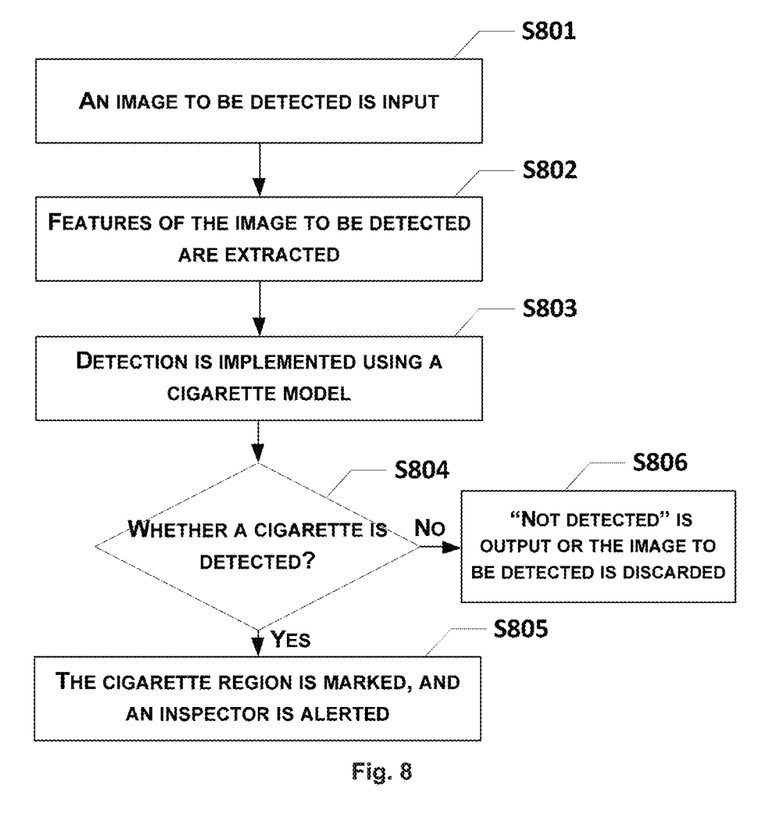
FIG. 8 illustrates a flowchart of automatic detection according to an embodiment of the present disclosure.
Figure 9:
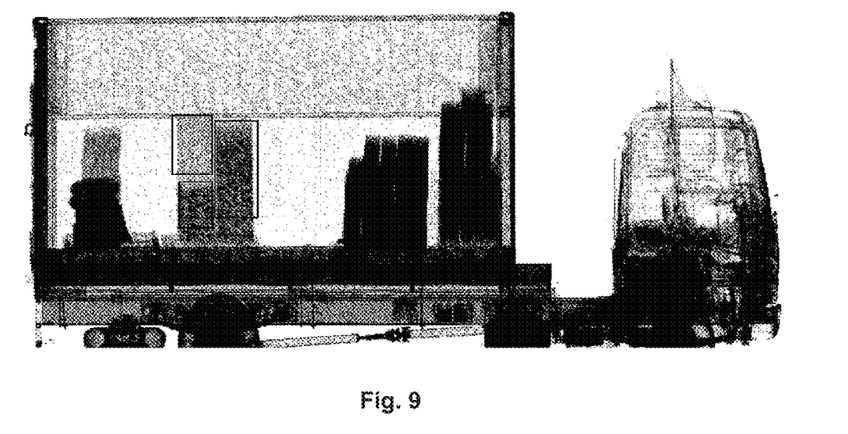
FIG. 9 illustrates a diagram of a cigarette detection result according to an embodiment of the present disclosure.

FIG. 6 illustrates a process of inspecting cigarettes. The cigarettes move relative to a ray source, thereby a perspective image is generated, and then automatic detection is implemented on the perspective image. The automatic detection process is actually a subset of the model setup process. As shown in FIG. 8, in step S801, an image to be inspected is input. In step S802, features of the image to be inspected are extracted. According to some embodiments, in this process, the image may be processed to obtain a region of interest. In step S803, pixel points in various regions of interest of the image to be inspected are traversed using a cigarette model, to extract neighborhood images surrounding the points and feature extraction, classification and judgment are implemented, to determine whether the points are cigarette regions and determine a degree of confidence of this conclusion. In step S804, it is judged whether there is a cigarette. If so, in step S805, after a result of whether each pixel is a suspected cigarette region, connected regions may be extracted to obtain a cigarette region. Otherwise, in step S806, information of "not detected" is output or the image to be inspected is discarded. FIG. 9 illustrates a detection diagram of markup of cigarettes in a rectangular block form.

Self-Learning Process

Preferably, the algorithm has a self-learning function, so that it can adapt to different detection environments, scanning devices, and cigarettes in more package forms. The algorithm used in self-learning is substantially the same as that in model setup, except that for the algorithm used in self-learning, only positive samples are acquired in the detection process (as shown in FIG. 10).

Figure 10:
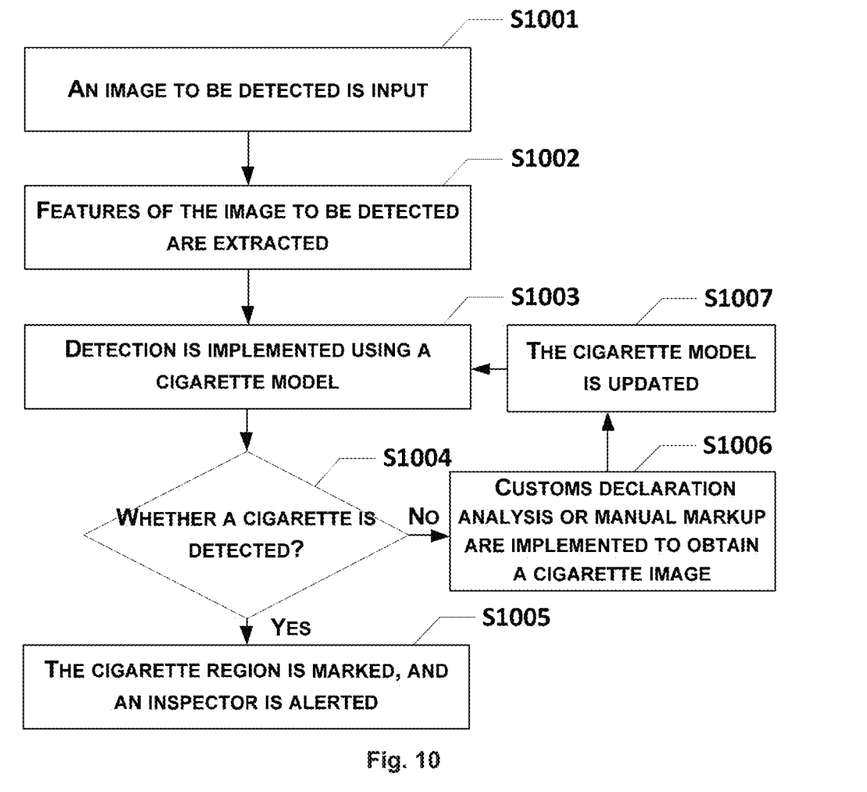
FIG. 10 is a flowchart of a self-learning process according to an embodiment of the present disclosure.

FIG. 10 illustrates a flowchart of a self-learning process according to an embodiment of the present disclosure. As shown in FIG. 10, in step S1001, an image to be inspected is input. In step S1002, features of the image to be inspected are extracted. According to some embodiments, in this process, the image may also be processed to obtain a region of interest. In step S1003, inspection is implemented using a cigarette model. In step S1004, it is judged whether there is a cigarette. If so, in step S1005, after a result of whether each pixel is a suspected cigarette region is obtained, connected regions are extracted to obtain a cigarette region. In step S1006, in the detection process, if no cigarette is detected using the manual discovery algorithm and markup is implemented, the marked regions are added to the positive samples using the algorithm. In step S1007, training is implemented again or incremental learning is implemented to obtain an updated model. However, if the obtained model still cannot be used to detect the newly added samples, the update is abandoned.

Further, if it is determined that a certain scanned image comprises a cigarette by automatically analyzing a customs declaration (for example, keyword fields in an electronic customs declaration, or by character recognition), a region with a maximum score is selected as a cigarette region by default from a diagram of degrees of confidence obtained in the detection process using the algorithm and training is implemented again. However, if the obtained model still cannot be used to detect a cigarette in the scanning, the update is abandoned.

Instances

General forms of the method are given in the above description. As for specific implementation of the algorithm, the method may be implemented using multiple existing algorithms. For example, HOG, DPM, and Deep Learning or the like which are mentioned above may be directly applied to the present disclosure, and the detection function may be implemented by implementing feature extraction and classification on the positive and negative samples. Specifically, in the respect of image feature extraction, various gradient based descriptors, texture descriptors or the like may be used, for example, HOG, Local Binary Pattern (LBP), Maximum Response Sets (also referred to as MR8) or the like. Further, structural feature process may be implemented using Bag of Words (BOW), Texton, Sparse Representation or the like. In the respect of the classifier, various types of linear, non-linear and integrated classifiers and neural networks may be used, for example, Fisher classifier, support vector machine, Boosting, random forest, multilayer perceptron or the like.

Without loss of generality, an embodiment using a specific algorithm is given herein. However, it can be understood that according to the teaching of the present disclosure, those skilled in the art can make changes or substitutions to the specific algorithm in the embodiment without departing from the idea of the present disclosure.

Firstly, Image Acquisition

The algorithm according to the present disclosure is generally applied to various types of large-scale goods/container scanning devices. In order to ensure the effectivity of the algorithm, it needs to normalize the image when acquiring an image. Assuming that the original two-dimensional image signal is X, the X resolution is scaled to 5 mm/pixel according to the physical parameters of the scanning device, and the image is stretched in gray, to obtain a normalized image $\overline{X}$.

Secondly, Region of Interest Extraction

An air part in $\overline{X}$ is detected, and is excluded from the detection process. The exclusion of the air part can not only improve the speed of calculation, but also can avoid false alarm in the air.

A statistics process is implemented on a histogram of $\overline{X}$, the brightest peak a is calculated in the histogram, and a normal distribution of air (a, $\sigma_a$) with the brightest peak as a center is fitted. In this case, the threshold is predetermined as $t=a-3*\sigma_a$. Pixels in $\overline{X}$ which are larger than the threshold $t_a$ are considered as air, and detection and calculation are not implemented.

Thirdly, Model Setup

A) Setting Up a Cigarette Detection Database

Cigarette images of different numbers of cigarettes in different arrangement forms in the container are scanned, to obtain a cigarette image library $\{\overline{X}\}$. About 100 images can satisfy the requirements for practicability. Similar objects and random objects are collected to form a negative sample library $\{Y\}$, in which each image does not comprise a cigarette.

B) Extracting Features of Positive Samples

Positions of cigarettes are marked manually in units of cases, to form positive sample libraries in three modes $P=P_1 \cup P_2 \cup P_3 = \{I_{1m}, m \in [1,M]\} \cup \{I_{2n}, n \in [1,N]\} \cup \{I_{3k}, k \in [1,K]\}$, wherein, $P_i = \{I_{ij}\}$ represents a positive sample library obtained in mode i, and each image $I_{ij}$ is a part of the images in $\{\overline{X}\}$, each image in the positive sample library only comprises cigarettes, M, N and K are respective numbers of samples in three modes respectively, and m, n and k are variables in ranges of [1,M], [1,N] and [1,K]

respectively. Preferably, the above three cigarette modes are trained independently, and therefore, the numbers of samples M, N and K are not required to be equal. However, in order to achieve comparative performance, the numbers of samples in the three modes should keep substantially the same.

Features of $I_{ij}$ are extracted. Without loss of generality, the HOG features are used in the embodiments. However, it can be understood by those skilled in the art that according to the teachings of the present disclosure, other existing methods may also be used to extract the features. After the features are extracted, the two-dimensional image $I_{ij}$ is converted into a high-dimensional vector $F_{ij}$. The sample library P is converted into a feature library $F=\{F_{1m}\}\cup\{F_{2n}\}\cup\{F_{3k}\}$.

As the three modes may be trained independently, training of one mode will be described below as an example.

C) Extracting Features of Random Negative Samples

Enough samples are randomly extracted from $\{Y)\}$, and feature extraction is implemented to form a set of negative sample features $\{N\}$. It should be noted that in the HOG algorithm, a number of dimensions of the features is decided by the size of the image, and therefore, numbers of dimensions of the three modes are different. The sizes of regions for extraction of negative samples are different in different modes.

D) In the Case that the Positive and Negative Sets of Samples are Given, Training the Classifier C Various types of existing algorithms in the mode recognition may be used for the training method. Without loss of generality, an open source tool of LIBSVM is used to train the classifier C in the present embodiment.

E) Selecting Samples which are Difficult to be Categorized to Optimize the Classifier The positive samples and the negative samples are categorized using the classifier C. According to the degree of confidence of the result, the negative samples which are easily to be categorized are removed, and enough random negative samples are re-added. Then, steps D) and E) are repeated, until the change in the classifier is small enough or an enough number of iterations is reached.

F) Adjusting the Positive Samples to Optimize the Classifier

The manual markup in step B) brings a large error, which makes the relative positions of the textures of the cigarettes ambiguous. In order to reduce the influence due to such factor, the soundings of the image $I_{ij}$ in B) is detected using the classifier C to find an optimal position of $I_{ij}$ and $I_{ij}$ is updated to $I_{ij}'$. Then, steps C) to F) are iterated until the change in the classifier is small enough or an enough number of iterations is reached.

Fourthly, Detection

In a case that an image to be inspected is given, normalization and ROI extraction processes are implemented on the image to generate HOG features H of ROI regions. H is traversed using a sliding window, to solve the maximum degree of confidence in each window in the three modes. The position where the degree of confidence is larger than a particular threshold is a position where a cigarette is located.

In order to improve the detection rate, cigarette detection may be implanted in multiple scales (i.e., different scaling ratios). For example, the perspective image is detected in three scales of [0.9, 1.0, 1.1], which can better solve the problem that there is certain deflection during placement of cigarettes.

In order to reduce the false alarm rate, after the detection result is processed, noises may be removed from the processed detection result. For example, median filtering may be implemented on the above diagram of degrees of confidence, or a binaryzation process may be implemented on the above diagram of degrees of confidence, and then area filtering is implemented on the connected regions or the like.

Further, in order to achieve real-time detection, only a part of points in the image may be detected using a uniform/random sampling method. In practice, most feature extraction algorithms such as HOG may also use nonoverlapped windows, and substitute neighborhood pixels with the windows to achieve effects of points replacing surfaces and locally approximating traversal.

Fifthly, Self-Learning Process

The self-learning process relates to a model update strategy. The algorithm used in self-learning is substantially the same as that in model setup, except that for the algorithm used in self-learning, only positive samples are acquired in the detection process (as shown in FIG. 10).

In the detection process, if no cigarette is detected using the manual discovery algorithm and markup is implemented, the marked regions are added to the positive samples using the algorithm. Training is implemented again or incremental learning is implemented to obtain an updated model. However, if the obtained model still cannot be used to detect the newly added samples, the update is abandoned.

Further, if it is determined that a certain scanned image comprises a cigarette by automatically analyzing a customs declaration (for example, keyword fields in an electronic customs declaration, or by character recognition), a region with a maximum score is selected as a cigarette region by default from a diagram of degrees of confidence obtained in the detection process using the algorithm and training is implemented again. However, if the obtained model still cannot be used to detect a cigarette in the scanning, the update is abandoned.

The foregoing detailed description has set forth various embodiments of the method and device for automatically detecting cigarettes via the use of diagrams, flowcharts, and/or examples. In a case that such diagrams, flowcharts, and/or examples contain one or more functions and/or operations, it will be understood by those skilled in the art that each function and/or operation within such diagrams, flowcharts or examples may be implemented, individually and/or collectively, by a wide range of structures, hardware, software, firmware, or virtually any combination thereof. In one embodiment, several portions of the subject matter described in the embodiments of the present disclosure may be implemented via Application Specific Integrated Circuits (ASICs), Field Programmable Gate Arrays (FPGAs), Digital Signal Processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of those skilled in the art in ray of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution.

Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

While the present disclosure has been described with reference to several typical embodiments, it is apparent to those skilled in the art that the terms are used for illustration and explanation purpose and not for limitation. The present disclosure may be practiced in various forms without departing from the spirit or essence of the present disclosure. It should be understood that the embodiments are not limited to any of the foregoing details, and shall be interpreted broadly within the spirit and scope as defined by the following claims. Therefore, all of modifications and alternatives falling within the scope of the claims or equivalents thereof are to be encompassed by the claims as attached.

We claim:

1. An inspection method, comprising steps of:
    acquiring a perspective image of an inspected object;
    processing the perspective image to obtain a region of interest; and
    automatically detecting the region of interest using a cigarette model, to determine whether the region of interest of the perspective image belongs to a cigarette;
    wherein before the step of automatically detecting the region of interest using a cigarette model, the method further comprises a step of setting up a cigarette model including steps of:
    setting up a cigarette image library;
    processing images in the cigarette image library to obtain respective regions of interest;
    extracting features of the regions of interest of the images in the cigarette image library; and
    training a classifier based on the extracted features to generate the cigarette model.

2. The method according to claim 1, wherein the step of setting up a cigarette image library comprises:
    scanning cigarette images of different numbers of cigarettes in various arrangement forms in a container to obtain a positive sample library of the cigarette model; and
    collecting images of objects similar to the cigarettes and random objects to form a negative sample library of the cigarette model, wherein no image in the negative sample library comprises a cigarette.

3. The method according to claim 1, wherein in the step of setting up a cigarette model, scanned images of the cigarettes which are stacked in various rules are divided into multiple modes with different widths, and the positive sample library of the cigarette model is generated based on the multiple modes.

4. The method according to claim 3, wherein the step of extracting features of the regions of interest of the images in the cigarette image library comprises:
    manually marking positions of the cigarettes in units of cases to form a set of positive sample features in the multiple modes; and
    randomly extracting multiple samples from the negative sample library for feature extraction to form a set of negative sample features.

5. The method according to claim 1, wherein the step of training a classifier based on the extracted features comprises:

(1) training the classifier in a case that a set of positive sample features and a set of negative sample features are given, wherein the set of positive sample features are extracted from a plurality of positive samples and the set of negative sample features are extracted from a plurality of negative samples;
    (2) classifying positive samples and negative samples using the classifier;
    (3) removing negative samples which are easily to be categorized according to a degree of confidence of a result, and re-adding enough random negative samples; and
    (4) repeating the above steps (1), (2) and (3), until a change in a classification result of the classifier is small enough or an enough number of iterations is reached.

6. The method according to claim 1, further comprising: performing a manual markup process or an automatic customs declaration analysis process on an image for which no cigarette is detected, to obtain a new cigarette image and update the cigarette model.

7. The method according to claim 1, wherein in the step of acquiring a perspective image of an inspected object, the image is scaled to a uniform resolution, and is stretched in gray, so that the whole possible value range is filled with a value domain of the image to implement a normalization operation.

8. The method according to claim 1, wherein in the step of processing the perspective image to obtain a region of interest, an air part in the perspective image is removed to prevent an air noise from generating a detection result.

9. The method according to claim 8, wherein in the step of processing the perspective image to obtain a region of interest, a binaryzation process is implemented on the perspective image with an air value using an air brightness threshold method, and a cigarette detection process is implemented only on a part of the image which has brightness lower than the threshold.

10. The method according to claim 1, wherein the step of automatically detecting the region of interest using a cigarette model comprises:
    normalizing a given image to be detected and acquiring a region of interest of the image to generate Histogram of Oriented Gradients (HOG) features of the region of interest;
    traversing the HOG features using a sliding window to solve a maximal degree of confidence thereof in each window in multiple modes; and
    determining a position where a degree of confidence is larger than a particular threshold as a position where a cigarette is located.

11. The method according to claim 1, wherein a cigarette is detected in multiple scales.

12. An inspection device, comprising:
    a digital radiation photographing apparatus configured to detect an inspected object with a ray to obtain a perspective image of the inspected object; and
    an image processing apparatus configured to process the perspective image to obtain a region of interest, and automatically detect the region of interest using a cigarette model, to determine whether the region of interest of the perspective image belongs to a cigarette;
    wherein the image processing apparatus is further configured to set up a cigarette model by;
    setting up a cigarette image library;
    processing images in the cigarette image library to obtain respective regions of interest;

extracting features of the regions of interest of the images in the cigarette image library; and training a classifier based on the extracted features to generate the cigarette model.

13. The device according to claim 12, wherein the device is configured to automatically detect cigarette smuggling.

\* \* \* \* \*